(12) United States Patent
Harris et al.

(10) Patent No.: US 11,694,144 B2
(45) Date of Patent: Jul. 4, 2023

(54) AUTOMATED IDENTIFICATION AND NOTIFICATION OF PERFORMANCE TRENDS

(71) Applicant: Sage Intacct, Inc., San Jose, CA (US)

(72) Inventors: Aaron Harris, Coppell, TX (US);
Ahmed Salhin, Edinburgh (GB)

(73) Assignee: Sage Intacct, Inc., San Jose, CA (US)

( * ) Notice: Subject to any disclaimer, the term of this patent is extended or adjusted under 35 U.S.C. 154(b) by 39 days.

(21) Appl. No.: 16/513,272

(22) Filed: Jul. 16, 2019

(65) Prior Publication Data

US 2020/0027047 A1    Jan. 23, 2020

Related U.S. Application Data

(60) Provisional application No. 62/700,511, filed on Jul. 19, 2018.

(51) Int. Cl.
| | | |
|---|---|---|
| *G06Q 10/06* | (2023.01) | |
| *G06Q 10/08* | (2023.01) | |
| *G06Q 10/0639* | (2023.01) | |

(52) U.S. Cl.
CPC .............. *G06Q 10/06393* (2013.01)

(58) Field of Classification Search
CPC ................ G06Q 10/06; G06Q 10/08
USPC ........................................ 705/7.39
See application file for complete search history.

(56) References Cited

U.S. PATENT DOCUMENTS

| | | | | |
|---|---|---|---|---|
| 9,294,361 B1 * | 3/2016 | Choudhary | ............. | H04L 43/04 |
| 10,783,583 B1 * | 9/2020 | Gunn, Jr. | ............... | G06Q 40/06 |
| 2002/0099598 A1 * | 7/2002 | Eicher, Jr. | ............ | G06Q 10/087 |
| | | | | 705/28 |
| 2010/0077077 A1 * | 3/2010 | Devitt | ..................... | H04L 41/22 |
| | | | | 709/224 |
| 2014/0120930 A1 * | 5/2014 | Harris | ................... | H04W 24/08 |
| | | | | 455/452.1 |
| 2014/0336984 A1 * | 11/2014 | Starr | .................. | G05B 23/0297 |
| | | | | 702/183 |
| 2014/0344024 A1 * | 11/2014 | Kempf | ............. | G06Q 10/06393 |
| | | | | 705/7.39 |
| 2015/0195405 A1 * | 7/2015 | McCormack | ....... | H04M 3/5175 |
| | | | | 379/265.06 |

(Continued)

OTHER PUBLICATIONS

Johansen, S., "Likelihood-Based Inference in Cointegrated Vector Autoregressive Models", Oxford University Press, 1995, pp. 1-2.

(Continued)

*Primary Examiner* — Nga B Nguyen
(74) *Attorney, Agent, or Firm* — Raubvogel Law Office

(57) ABSTRACT

A system and method may be used to indicate change to a key performance indicator (KPI). The method may include receiving data regarding operation of an enterprise, generating the KPI based on the data, assessing a rate of change of the KPI, and initiating notification of a user regarding the rate of change of the KPI. The method may further include modeling the KPI to obtain an ordinary rate of change of the KPI, or a KPI element incorporated into the KPI, over time, comparing the rate of change with the ordinary rate of change, and, based on a difference between the rate of change and the ordinary rate of change, determining that the notification is to be initiated. The method may further include determining whether to notify a user of the change to the KPI based on materiality of the KPI to the user.

31 Claims, 8 Drawing Sheets

(56) References Cited

U.S. PATENT DOCUMENTS

| | | | | |
|---|---|---|---|---|
| 2015/0310371 A1* | 10/2015 | Byrne | .............. | G06Q 10/06393 |
| | | | | 705/7.39 |
| 2016/0103559 A1* | 4/2016 | Maheshwari | ......... | G06F 3/0481 |
| | | | | 715/738 |
| 2016/0104076 A1* | 4/2016 | Maheshwari | .......... | G06N 20/00 |
| | | | | 706/12 |
| 2016/0104093 A1* | 4/2016 | Fletcher | ........... | G06Q 10/06393 |
| | | | | 705/7.39 |
| 2016/0292611 A1* | 10/2016 | Boe | .................. | G06Q 10/06393 |
| 2017/0149604 A1* | 5/2017 | Burford | .............. | H04L 41/0681 |
| 2017/0329614 A1* | 11/2017 | Schon | ................ | G06F 3/04845 |
| 2018/0123909 A1* | 5/2018 | Venkitapathi | ......... | H04L 67/306 |
| 2018/0240052 A1* | 8/2018 | Goyal | ................ | G06Q 10/0637 |
| 2020/0021503 A1* | 1/2020 | de Lima | ............. | H04L 41/0896 |

OTHER PUBLICATIONS

Huang, N.E., et al., "The empirical mode decomposition and the Hilbert spectrum for nonlinear and non-stationary time series analysis", Proceedings of the Royal Society of London. Series A: Mathematical, Physical and Engineering Sciences, 454(1971), pp. 903-995.

* cited by examiner

AUTOMATED IDENTIFICATION AND NOTIFICATION OF PERFORMANCE TRENDS

CROSS-REFERENCE TO RELATED APPLICATION

The present application claims the benefit of U.S. Provisional Application Ser. No. 62/700,511 for "Automated Identification and Notification of Accelerating Performance Trends", filed Jul. 19, 2018, which is incorporated by reference herein in its entirety.

TECHNICAL FIELD

The present document relates to techniques for automatically identifying certain changes and trends in an organization's key performance indicators (KPIs), and for generating automated notifications of such changes and trends.

DESCRIPTION OF THE RELATED ART

Managers of companies use a variety of tools to sift through the large quantities of available data regarding enterprise performance. Many managers use "Key Performance Indicators," or "KPIs," to summarize important operational data. Indeed, hundreds of KPIs exist, with varying relevance across industries, geographies, and enterprise structures. Even with summary-level information available in the form of KPIs, it can be difficult for a business leader to know which KPIs to pay attention to, and what KPI changes are truly meaningful.

SUMMARY

According to various embodiments, machine learning is used to identify an organization's key performance indicators (KPIs) and to then monitor those KPIs in real-time. When accelerating, decelerating, or other trends are identified, the system notifies decision makers so that they can review potential performance opportunities and risks. In at least one embodiment, the system facilitates real-time review by deconstructing KPIs into their individual transaction inputs, flagging those inputs, and analyzing their performance impact.

According to one embodiment, a method for indicating change to a key performance indicator (KPI) may include receiving data regarding operation of an enterprise, generating the KPI based on the data, assessing a rate of change of the KPI, and initiating notification to a user regarding the rate of change of the KPI.

The method may further include, prior to assessing the rate of change of the KPI, determining that that the KPI is likely to be of interest to the user, based on the materiality of the KPI to a user and a determination as to whether the change to the KPI is sufficiently significant.

Determining that the KPI is likely to be of interest to the user may include receiving user input indicating that the user wishes to follow the KPI.

Determining that the KPI is likely to be of interest to the user may include generating a materiality score based on one or more prior user actions involving the KPI, and determining that the materiality score exceeds a threshold.

The method may further include receiving user input including the one or more prior user actions. The prior user actions may include at least one of selecting the KPI for viewing, selecting a collection of KPIs including the KPI for viewing, and requesting information regarding the KPI.

The method may further include obtaining an ordinary rate of change, over time, of the KPI and/or a KPI element incorporated into the KPI, comparing the rate of change with the ordinary rate of change, and, based on a difference between the rate of change and the ordinary rate of change, determining that the notification is to be initiated.

Obtaining the ordinary rate of change may include comparing historical values of the KPI or KPI element with a plurality of models to ascertain whether each of the models has at least a threshold level of accuracy, and fitting all models of the plurality of models with at least the threshold level of accuracy to the KPI or KPI element.

Obtaining the ordinary rate of change may include deconstructing the KPI into one or more of the KPI elements, each of which comprises at least part of the data, or of intermediate data obtained from the data, and fitting a model to the one or more KPI elements.

Obtaining the ordinary rate of change may include preprocessing the KPI and/or the KPI element by carrying out one or more selections from the group consisting of linear transformation, winsorizing, Fourier transformation, standardization, and normalization; and fitting a model to the KPI and/or the KPI element.

Obtaining the ordinary rate of change may include preliminarily analyzing the KPI and/or the KPI element by carrying out one or more selections from the group consisting of normality detection, serial autocorrelation, stationarity, co-integration, noise reduction, time-frequency analysis, and spectral density estimation; and fitting a model to the KPI and/or the KPI element.

The method may further include transmitting the notification to the user.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

The present document describes systems and methods for indicating change to key performance indicators (KPIs). The method may include receiving data regarding operation of an enterprise, generating a KPI based on the data, assessing a rate of change of the KPI, and initiating notification to a user regarding the rate of change of the KPI. The method may further include modeling the KPI to obtain an ordinary rate of change of the KPI over time, comparing the rate of change with the ordinary rate of change, and, based on a difference between the rate of change and the ordinary rate of change, determining that the notification is to be initiated.

System Architecture

According to various embodiments, the system can be implemented on any one or more electronic devices equipped to receive, store, process, and present information. Such an electronic device may be, for example, a desktop computer, laptop computer, smartphone, tablet computer, smartphone/tablet ("phablet"), wearable computing device, and/or the like. Any of a wide variety of device types, operating systems, and the like may be used. Accordingly, the following description is intended to illustrate various embodiments by way of example, rather than to limit scope.

Figure 1A:
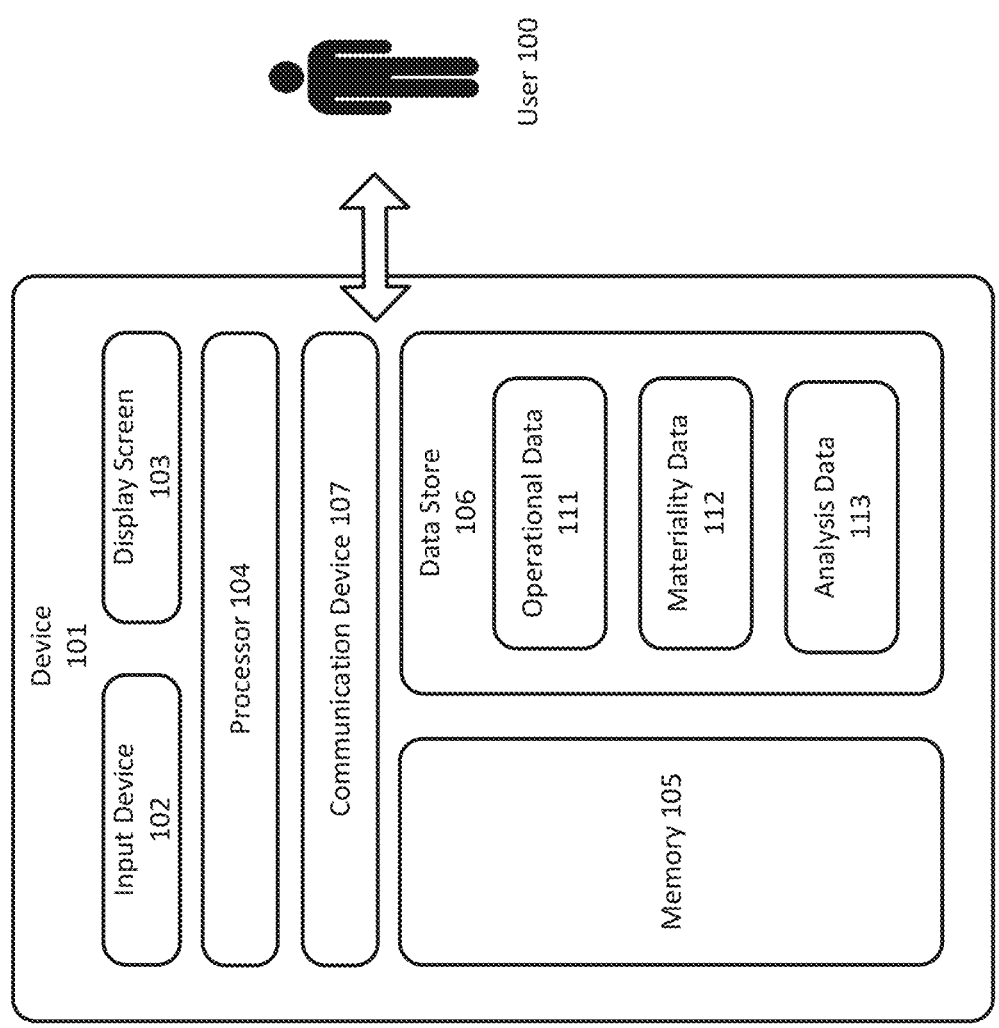
FIG. 1A is a block diagram depicting a hardware architecture according to one embodiment.

Referring now to FIG. 1A, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 has a number of hardware components well-known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may include operational data 111, materiality data 112, analysis data 113, and/or other data (not shown), which may include any additional data that facilitates KPI tracking, analysis, and/or notification. In at least one embodiment, operational data 111, materiality data 112, and/or analysis data 113 can be stored at another location, remote from device 101, and device 101 can access such operational data 111, materiality data 112, and/or analysis data 113 via any suitable communications protocol.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

Display screen 103 can be any element that displays information such as text and/or graphical elements. Display screen 103 may optionally display operational data 111, materiality data 112, analysis data 113, other data regarding KPI tracking, analysis, and/or notification, and/or the like. Display screen 103 may display any known user interface elements, including elements that modify the presentation of information on display screen 103. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

A communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 1B:
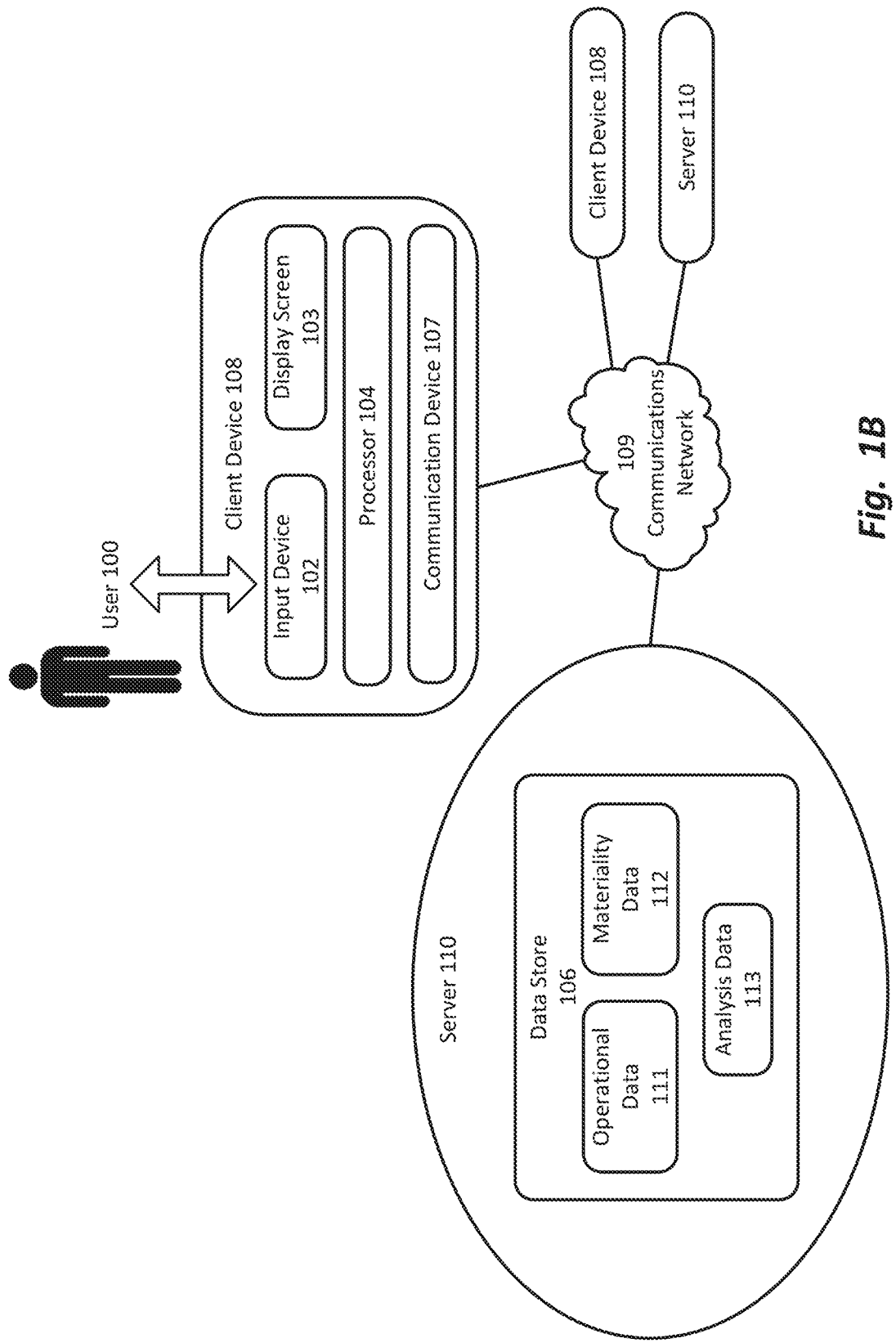
FIG. 1B is a block diagram depicting a hardware architecture in a client/server environment, according to one embodiment.

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As in FIG. 1A, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1A, data store 106 may include operational data 111, materiality data 112, analysis data 113, and/or other data (not shown); alternatively, such operational data 111, materiality data 112, analysis data 113, and/or other data can be stored elsewhere (such as at another server) and retrieved as needed.

In addition to or in the alternative to the foregoing, operational data 111, materiality data 112, analysis data 113, and/or other data may also be stored in a data store 106 present in client device 108. In some embodiments, operational data 111, materiality data 112, analysis data 113, and/or other data may have elements distributed between server 110 and client device 108 and/or other computing devices in order to facilitate secure and/or effective communication between these computing devices.

As in FIG. 1A, display screen 103 can be any element that displays information such as text and/or graphical elements. Various user interface elements, dynamic controls, and/or the like may be used in connection with display screen 103.

As also set forth in FIG. 1A, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as also set forth in the description of FIG. 1A.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 1B. The data structures and/or computing instructions used in the performance of methods described herein may be distributed among any number of client devices 108 and/or servers 110. As used herein, "system" may refer to any of the components, or any collection of components, from FIGS. 1A and 1B, and may include additional components not specifically described in connection with FIGS. 1A and 1B.

Data Structures

Figure 2:
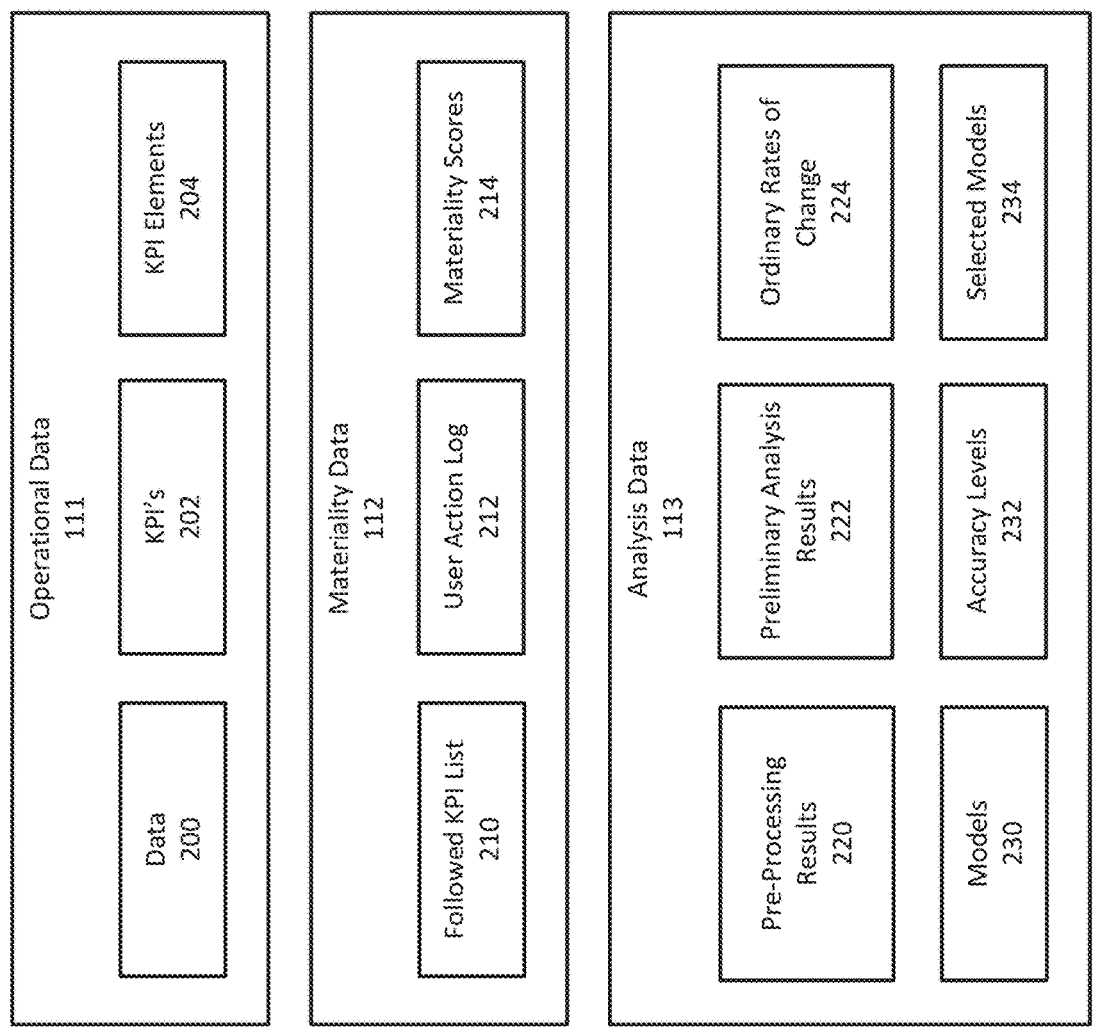
FIG. 2 is a block diagram depicting data that may be stored in connection with KPI tracking, analysis, and/or notification, according to one embodiment.

FIG. 2 is a block diagram depicting data that may be stored in connection with KPI tracking, analysis, and/or notification, according to one embodiment. Specifically, operational data 111, materiality data 112, and analysis data 113 of FIGS. 1A and 1B are depicted in greater detail.

More specifically, operational data 111 may include data 200, KPIs 202, and KPI elements 204.

Data 200 may be raw data regarding operation of an enterprise. Data 200 may be gathered and recorded in the system (for example, on data store 106) as, for example, transactions such as revenues and expenses, account balances, or other occurrences in the operation of the business. Parameters such as customers, vendors, dates, categories, and the like may be recorded.

Each of the KPIs 202 may be generated based on data 200, for example, as a summary of events occurring over a predetermined period of time. Some of the KPIs 202 may be ratios that effectively compare two summaries of data 200 with each other. A wide variety of KPIs are known in the business management and business intelligent arts.

KPI elements 204 may be the constituent components of KPIs 202. KPI elements 204 may include data 200 in its raw form, and/or various combinations and/or summaries of data 200 that are mathematically combined together to yield KPIs 202. KPI elements 204 will be illustrated in greater detail below, in connection with FIG. 7.

Materiality data 112 may include a followed KPI list 210, a user action log 212, and/or materiality scores 214.

Followed KPI list 210 may be a list of KPIs 202 in which a user 100 has explicitly indicated interest. For example, user 100 may be "following" KPI 202, or may have otherwise providing user input indicating interest in KPI 202.

User action log 212 may be a log of user inputs received from user 100 in relation to KPIs 202. For example, any time user 100 chooses to view any of KPIs 202, or a collection of information including any of KPIs 202, or chooses to view more information about any of KPIs 202, the user action may be stored in user action log 212. User action log 212 may be used to infer user interest in particular KPIs 202 without requiring user 100 to explicitly indicate such interest.

Materiality scores 214 may be scores that indicate the likelihood that particular KPIs 202 are of interest to user 100. Materiality scores 214 may be calculated, for example using followed KPI list 210 and/or user action log 212. In some embodiments, materiality scores 214 may be used only for KPIs 202 in which user 100 has not explicitly indicated interest, and may thus be based on user action log 212 and not followed KPI list 210. Exemplary determination of materiality scores 214 will be set forth in greater detail subsequently.

Analysis data 113 may include pre-processing results 220, preliminary analysis results 222, an ordinary data/KPI rate of change 224, models 230, accuracy levels 232, and/or selected models 234.

Pre-processing results 220 may include KPI elements and/or KPIs derived from KPI elements 204 and/or KPIs 202, after performance of various pre-processing steps, which will be described subsequently. Preliminary analysis results 222 may include the results of preliminary analysis steps carried out on KPI elements 204 and/or KPIs 202.

Ordinary rates of change 224 may include the predicted rate of change of KPI elements 204 and/or KPIs 202, based on historical performance of the enterprise. Ordinary rates of change 224 may be used as baselines to determine whether an observed rate of change in KPI elements 204 and/or one or more of KPIs 202 is anomalous. Ordinary rates of change 224 may be determined by modeling KPI elements 204 and/or KPIs 202.

Models 230 may be mathematical models that can be applied to KPI elements 204 and/or KPIs 202. Models 230 may include any known mathematical construct(s) that can be used to represent data mathematically. Some models 230 may accurately represent KPI elements 204 and/or KPIs 202, and others may not. Accuracy levels 232 may be computed to represent the conformance of models 230 to KPI elements 204 and/or KPIs 202. Models 230 with higher accuracy levels 232 may be included in a list of selected models 234, which may be used to generate or predict the ordinary rates of change 224.

Notably, FIG. 2 only depicts examples of data that may be recorded and used by a system according to the present disclosure. Operational data 111, materiality data 112, and/or analysis data 113 may exclude any of the fields shown in FIG. 2, and/or may include additional fields of data not specifically shown in FIG. 2. Further, as mentioned previously, the system may capture and maintain other data in addition to or in the alternative to operational data 111, materiality data 112, and analysis data 113.

Performance Cards

Figure 3:
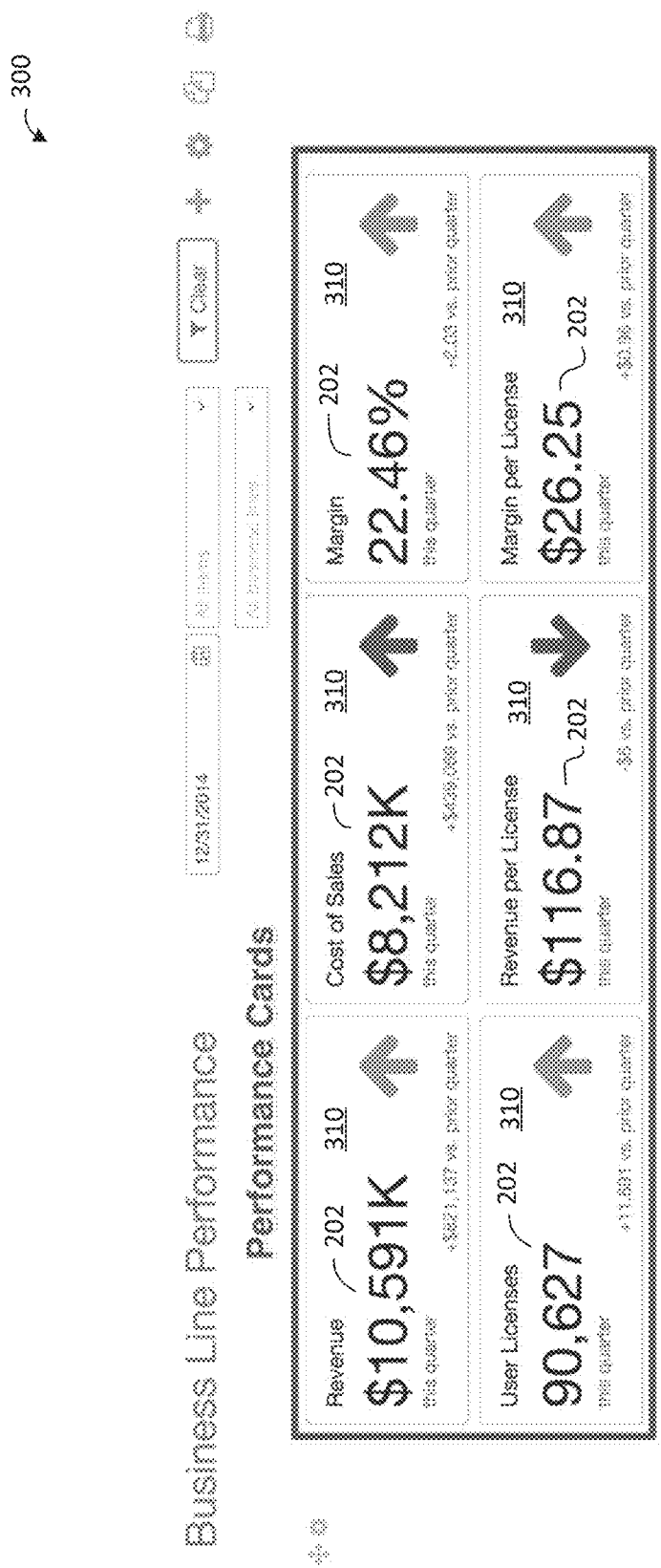
FIG. 3 is a screenshot diagram depicting exemplary presentation of KPIs on performance cards, according to one embodiment.

FIG. 3 is a screenshot diagram 300 depicting exemplary presentation of KPIs 202 on performance cards 310, according to one embodiment. Businesses continuously assess the performance of their various functions by relying on KPIs 202. These KPIs 202, usually in a form of numeric entities, are predefined to provide a condensed overview on the health of the functions they assess, including, for example, finance, marketing, operations, sales, and/or the like. KPIs 202 can be then communicated to stakeholders through periodic and/or on-demand reports, visualizations, or alerts. However, the complex nature of business operations makes it advantageous to carry out a continuous review of KPIs 202 to exploit potential opportunities and mitigate risks as they arise. Therefore, KPIs 202 may be continuously calculated and communicated to stakeholders in the form of performance cards 310 to support the decision-making process.

Nevertheless, the infinite number of KPIs 202 that can be either set by the system or created/customized by users 100 may make it difficult to conclusively review of each individual KPI 202 due to time, effort, and cost constraints. In addition, the condensed nature of KPIs 202, although useful, may not be suitable for detailed analysis; rather, detailed review of the underlying metrics/figures that are used to construct a KPI 202 may be needed. Such detailed review may be needed to understand the implied meaning of a KPI 202 and provide a meaningful alert regarding material changes. A mechanism in which KPIs 202 are prioritized, displayed, traced and monitored based on the user's historical interactions may provide significant improvement to resource allocations efficiencies, prediction of potential risks and bottlenecks, and identification of anomalous behavior.

Notification of KPI Rate of Change

The present disclosure provides systems and methods for autonomously identifying, prioritizing and actively monitoring material KPIs 202. In addition, it provides systems and methods for tracking material KPIs 202 based on user historical interactions, evaluating rates of changes in KPIs 202 and/or KPI elements 204, and ascertaining when corresponding alerts should be sent. The system may analyze a predefined set of KPIs 202 as well as metrics, such as materiality data 112, that indicate how user 100 is interacting with individual KPIs 202. The system may follow a methodology to identify the materiality of an individual KPI 202 to a user 100 and perform multiple operations in order to track significant change and notify user 100 when such change occurs.

Figure 4:
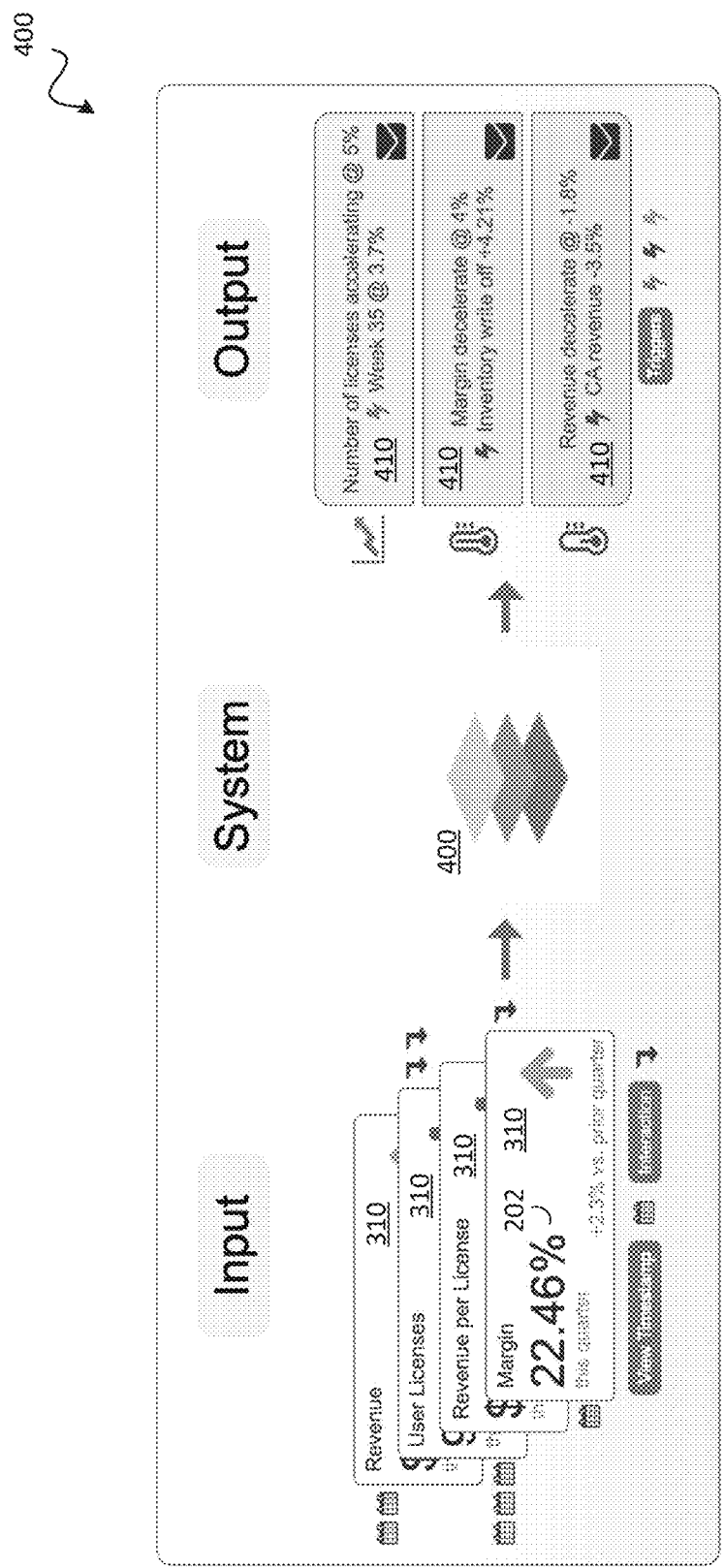
FIG. 4 is a schematic block diagram depicting an exemplary operation of a system for providing alerts based on changes to KPIs, according to one embodiment.

FIG. 4 is a schematic block diagram depicting an exemplary operation of a system 400 for providing alerts based on changes to KPIs 202, according to one embodiment. The input to system 400 may include operational data 111 such as KPIs 202 and/or KPI elements 204, which may include calculation periods, construction elements, and the like. In addition, system 400 may receive materiality data 112 regarding KPIs 202 and/or performance cards 310, such as the number of views, the frequency of viewing, requests for details, timestamps of start and end of viewings, following behavior, and/or the like. In order to assess the importance, or materiality, of a KPI 202 to user, system 400 may follow predefined procedures to assign materiality score 214 to that KPI 202. The procedure may involve calculating nonparametric statistics and assigning a weight to each interaction with KPI 202.

System 400 may continuously prioritize KPIs 202 based on materiality scores 214, and may trigger an analytical procedure to analyze KPIs deemed to be material to user 100. The analytical procedure may include deconstructing material KPIs 202 to their KPI elements 204. KPI elements 204 may then be analyzed, and preliminary analysis may be performed to identify the characteristics of their temporal behavior. Based on the characteristics of KPI elements 204, several of models 230 (i.e., selected models 234) may be fitted to estimate the temporal rate of change in their values and/or a confidence interval to represent estimated lower and upper bounds. If the value of a KPI 202 or KPI element 204 changes with a rate does not fall within the confidence interval and/or significantly diverts from the predicted value of the estimate, the impact on KPI 202 may be analyzed and a notification 410 may be transmitted to user 100 to notify user 100 of the change.

In addition, system 400 may collect new data 200 to generate new KPI elements 204 to measure the performance of selected models 234 in order to enhance future predictions by optimizing selected models 234. Revised selected models 234 may be used to revise ordinary rates of change 224 accordingly.

Figure 5:
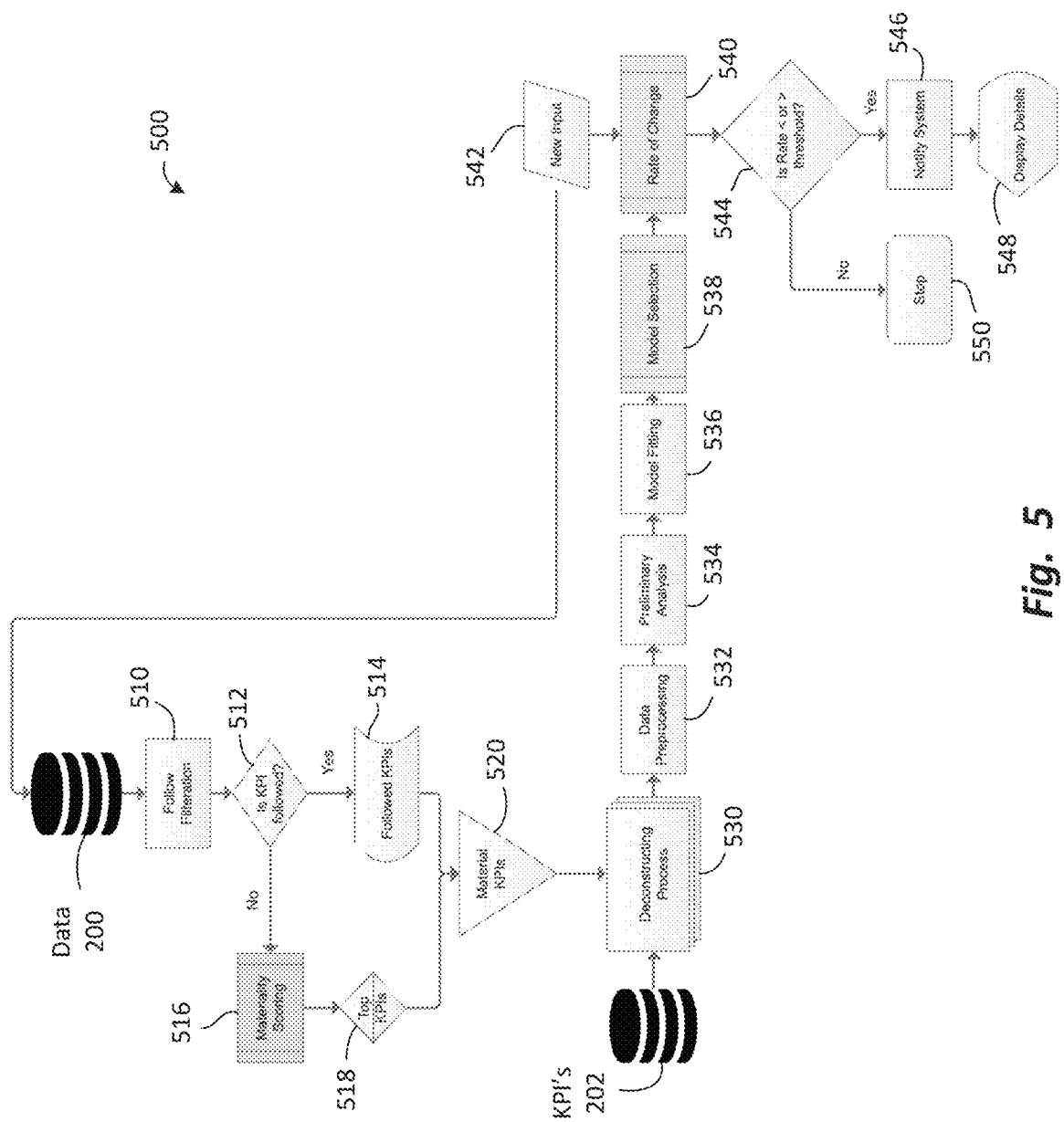
FIG. 5 is a flowchart diagram depicting a method for providing notifications based on a rate of change in a KPI, according to one embodiment.

FIG. 5 is a flowchart diagram depicting a method 500 for providing notifications based on a rate of change in a KPI, according to one embodiment. Method 500 may be carried out by a system 400, which, as mentioned previously, may include any of the components shown and described in connection with FIGS. 1A and 1B. Method 500 may include collecting data 200 on all available KPIs 202, materiality identification, KPI deconstruction, modeling, and/or significance detection.

Data Collection and Materiality Identification

Data collection and materiality identification may commence with a step 510 in which KPIs 202 are filtered based on whether user 100 has selected them to be followed and/or otherwise explicitly indicated interest in them. A query 512 may ascertain whether a KPI 202 is followed by user 100. If so, in a step 514, KPI 202 may be included in followed KPI list 210. All KPIs 202 on followed KPI list 210 may be assumed to be material.

If KPI 202 is not followed by user 100, method 500 may proceed to a step 516 in which KPI 202 (and other KPIs 202)

is scored for materiality, resulting in assignment of materiality scores 214. In a step 518, KPIs 202 with materiality scores 214 exceeding a threshold may be added to a list of top KPIs 202. In a step 520, top KPIs 202 and the KPIs on followed KPI list 210 may be combined into a set of material KPIs 202.

KPIs 202 may include values that are constructed from one or more measurements to evaluate the status of an article of interest. For example, an Inventory Turnover KPI is the ratio between sales and average inventory for a given period. It refers to the number of times a company has sold and replaced its inventory during the period. It indicates the efficiency with which the company handles its inventory.

Many KPIs 202 are calculated periodically in quantitative values and communicated to users 100 with details on historical and/or cross-sectional values. For example, Profitability KPIs are usually calculated as a percentage, often based on the ratio of a measure of profit (gross profit, net profit, cashflow, or the like) to a measure of revenue or investment. Profitability KPIs can be calculated over time horizons and across multiple divisions of the business.

Data 200 collected to generate KPIs 202 may include their values, timestamps of calculation, frequency of viewing, interaction details, and/or the like. Users 100 can indicate interest in a KPI 202 directly by choosing to follow it (e.g., in a dashboard showing one or more KPIs 202) or indirectly by taking actions that show interest, which may be stored in user action log 212. If a user 100 shows interest in a KPI 202, it may be defined as a "material KPI." If a user 100 explicitly follows a KPI 202, its identification may be stored in followed KPI list 210.

If, however, user 100 does not explicitly follow a KPI 202, interest in KPI 202 can be proxied (i.e., inferred) in response to action taken by user 100 to load a dashboard containing KPI 202, or perform other actions relative to KPI 202. For example, user 100 may also show interest in KPI 202 by clicking the displayed value of KPI 202, so as to invoke a drill-down action to display more details regarding KPI 202 (such as KPI elements 204 that correspond to KPI 202). In such case, user interaction with "unfollowed" KPIs 202 may be analyzed to identify their materiality via step 516 of materiality scoring. This will be further shown and described in connection with FIG. 6C.

Figure 6:
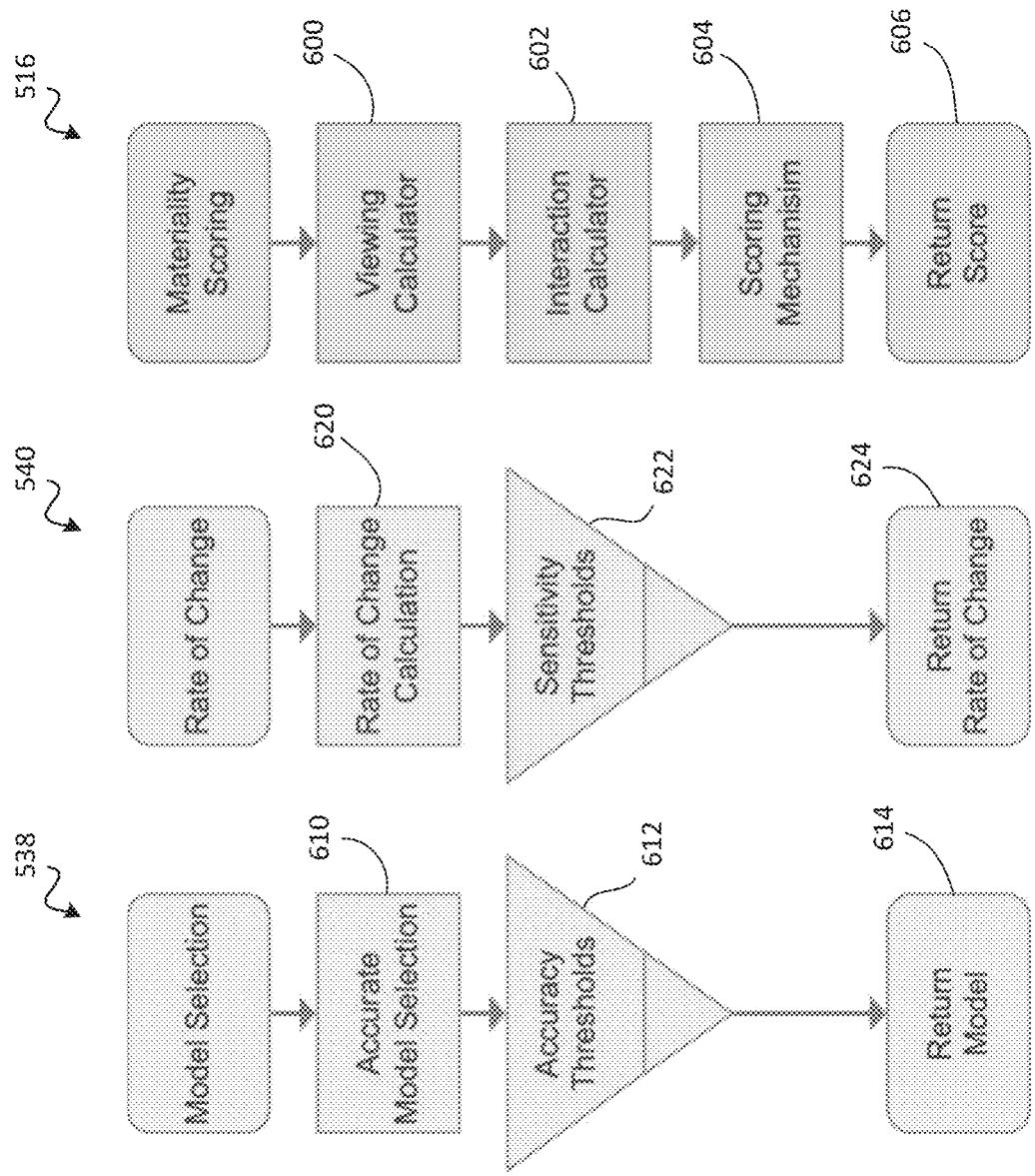
FIGS. 6A, 6B, and 6C are flowchart diagrams of certain steps of FIG. 5.

FIGS. 6A, 6B, and 6C are flowchart diagrams of step 540, step 538, and step 516 of FIG. 5, respectively. FIG. 6C, which depicts materiality scoring step 516, may commence with a step 600 in which a viewing calculator assesses (for example, via assignment of a score component) the frequency, timing, and/or circumstances surrounding instances in which user 100 has viewed a KPI 202. In a step 602, an interaction calculator may assess (for example, via assignment of another score component) the frequency, timing, and/or circumstances surrounding instances in which user 100 has taken another action relative to KPI 202, such as viewing more details regarding KPI 202.

In a step 604, a scoring mechanism may combine the assessments computed in step 600 and step 602 to generate materiality score 214 for KPI 202. In a step 606, materiality score 214 is returned for further use by system 400.

Various formulas may be used in step 604. According to one example, viewing and detailed interactions are assigned 1 and 5 points respectively. However, interest in a KPI 202 may deteriorate over time when a user 100 discontinues actions that show interest. Therefore, points on an action of interest on a given day may be weighted by the number of days lapsed since the last action. Scoring methodology may be defined according to the following example:

1. Data regarding the number and timestamps of viewing and interaction are aggregated per KPI with multiple temporal frequencies (daily, weekly, monthly, etc.)
2. A KPI viewing score in a given day is calculates as follows:

$$V_s = \left(1 * e^{\left(-\frac{t_v}{365}\right)}\right)$$

where $V_s$ is the viewing score, $t_v$ is the number of days lapsed since the last viewing and $$e^{\left(-\frac{t_v}{365}\right)}$$

is an exponential decay function to account for discontinued action. For example, $V_s$ equals 1 point if the user views KPI 202 in two consecutive days ($t_v$ equals 0). However, $V_s$ equals 0.981 point if user stopped viewing KPI 202 for 7 consecutive days.

3. A KPI detailed interaction score in a given day is calculated as follows:

$$D_s = \left(5 * e^{\left(-\frac{t_d}{365}\right)}\right)$$

where $D_s$ is the detailed interaction score, and $t_d$ is the number of days lapsed since the last detailed interaction.

$$e^{\left(-\frac{t_d}{365}\right)}$$

is an exponential decay function to account for discontinued action and 5 is a weighting constant that denotes the increased materiality inferred from the detailed interaction compared to only viewing KPI 202. For example, $D_s$ equals 5 if user 100 drilled down to view KPI details on two consecutive days ($t_d$ equals 0). However, $D_s$ equals 4.905 points if user stopped interacting with the KPI details for 7 consecutive days.

4. The materiality score is calculated as follow:

$$M_s = V_s + D_s$$

where $M_s$ is the materiality score, $V_s$ is the viewing score and $D_s$ is the detailed interaction score.

When the set of material KPIs 202 is computed, the set may include all KPIs followed by user 100 plus the top five scored KPIs 202 in which a user has indicated interest as measured by Ms.

For example, Inventory Turnover is a ratio showing how many times a company has sold and replaced its inventory during a given period. If a user 100 viewed and interacted with the Inventory Turnover KPI on Mar. 21, 2019 and revisited the KPI on Apr. 26, 2019, materiality score 214 of KPI 202 on Apr. 26, 2019 equals:

$$M_s = V_s + D_s$$

$$M_s = \left(1 * e^{\left(-\frac{36}{365}\right)}\right) + \left(5 * e^{\left(-\frac{36}{365}\right)}\right) = 5.43647.$$

KPI Deconstruction 530

Returning to FIG. 5, once a set of material KPIs 202 is compiled in step 520, each KPI 202 in the set may be deconstructed, in a step 530, to KPI elements 204 that include its constituent parts that were used to construct it in the first place. A KPI 202, for example, may be defined by a financial or statistical measure. These measures may further be defined as either account balances for a relative reporting period (measured either at the end or the beginning of the period) or the sum of transactions during the period. These measures may be combined into sets and may be included in calculations. All of these measures can be deconstructed to a set of general ledger accounts. Each general ledger account in the set will affect the value of KPI 202.

For example, the current ratio is a financial KPI that reflects a business's ability to meet its short-term financial obligations. A breakdown of the current ratio will be shown and described in connection with FIG. 7.

Figure 7:
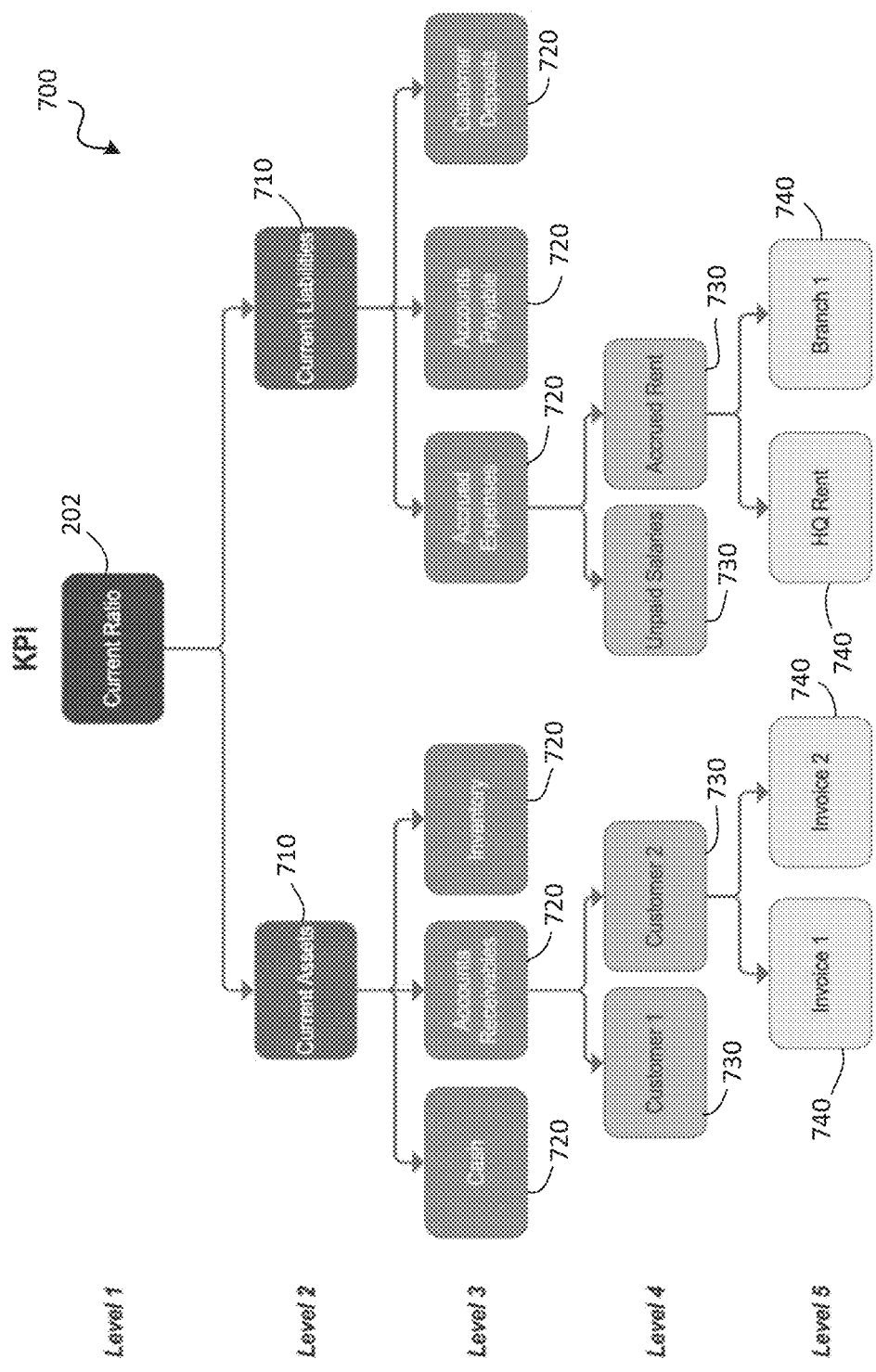
FIG. 7 is a schematic block diagram depicting breakdown of a KPI, the "current ratio," into KPI elements, according to one embodiment.

FIG. 7 is a schematic block diagram 700 depicting breakdown of a KPI 202, the "current ratio," into KPI elements 204, according to one embodiment. The current ratio is defined as level 1, with KPI elements 204 at successive levels of granularity at increasing levels (level 2 KPI elements 710, level 3 KPI elements 720, level 4 KPI elements 730, and level 5 KPI elements 740).

More specifically, the current ratio is calculated as follows:

$$\text{Current Ratio} = \frac{\text{Current Assets}}{\text{Current Liabilities}}$$

Deconstructing the current ratio KPI (level 1) results in collecting data on current assets and current liabilities (level 2 KPI elements 710), which could be deconstructed further to their root elements (level 3 KPI elements 720). For instance, current assets can be deconstructed to cash, accounts receivables, inventory, which are level 3 KPI elements 720. Current liabilities can be deconstructed to accounts payable, accrued expenses, and customer deposits, which are also level 3 KPI elements 720. Each of level 3 KPI elements 720 can be deconstructed further to a set of transactions for the period. For example, accounts receivable can be deconstructed back to outstanding amounts for multiple customers (level 4 KPI elements 730) which result from one or more outstanding invoices (level 5 KPI elements 740).

Data Pre-Processing 532

Returning again to FIG. 5, after KPIs 202 have been deconstructed, their constructions may be modeled in order to identify the normal rate of change which are used in prediction to generate ordinary rates of change 224, which may, in turn, be used to identifying anomalous behavior of a KPI 202.

Prior to modeling, KPI elements 204 and/or KPIs 202 may be pre-processed in a step 532 to convert them into forms that can be used during later stages of modeling. Data pre-processing 532 may include steps such as linear transformation, winsorizing, Fourier transformation, standardization, normalization, and/or the like.

For example, fitting some time series models on cash balances as a standalone KPI 202 or as a KPI element 204 of another KPI 202 may be carried out by calculating the natural logarithmic value of the balances rather than using the absolute figures. However, since cash balances can include negative values, and calculating the natural logarithmic value of a negative value is mathematically undefined, a linear transformation might be used to map cash balance values to other values in a way that removes the negative values and preserves the operations of addition and scalar multiplication.

Preliminary Analysis 534

The modeling can be performed at one or multiple levels of constructions, as depicted in FIG. 7. For example, modeling may, in some embodiments, be carried out directly on a KPI 202. Additionally or alternatively, modeling may be carried out on KPI elements 204 of any desired level. The decision of which level(s) will be modeled may be based on the characteristics of KPI elements 204 and the accuracy of model prediction, and may be made in a step 534 in which preliminary analysis of KPI 202 and/or its KPI elements 204 is carried out.

For example, the inherent noise in level 5 KPI elements 740 of some KPIs 202 may prevent an accurate prediction of future values of such level 5 KPI elements 740. However, the impact of such noise may be eliminated if modeling is performed on a higher level, for example, the corresponding level 4 KPI elements 730 and/or level 3 KPI elements 720. Therefore, the choice of the level to be modeled may be based on some preliminary analysis of the characteristics of each KPI element 204.

Preliminary analysis might also include, for example, detecting normality, serial autocorrelation, stationarity, and/or co-integration of time series. Additionally or alternatively, it may include noise reduction, time-frequency analysis, spectral density estimation, and/or the like.

For example, fitting a model to a fluctuating time series that represents values of inventory may benefit from preliminary analysis in order to accurately estimate and forecast the rate of change in its values. In particular, inventory values may have seasonal and/or trending patterns based on the business industry and characteristics. However, system 400 may not store the periodicity with which the inventory values fluctuate. Therefore, system 400 may advantageously autonomously detect such behavior (for example, by detecting and applying such periodicity) in order to correctly choose the model that provides accurate results. Consequently, a time series decomposition may advantageously be applied prior to selecting and fit statistical models to the inventory values. This preliminary analysis may include decomposing the time series into trend, cyclical, seasonal, and/or irregular components.

Model Fitting

After step 534, method 500 may proceed to a step 536 in which one or more models are fitted to KPIs 202 and/or KPI elements 204 in order to estimate and predict their cross sectional and/or temporal rate of change. The choice of the algorithm to use in estimating the rate of change may follow the results of the preliminary analysis carried out in step 534. For example, a preliminary analysis might detect that the salaries ledger account demonstrates a serial correlation behavior between its values. In other words, the values of the salaries may be correlated with their historical values at a given interval. This could be due to a strategic expansion plan that is implemented by the business management, by way of example. In such case, system 400 may choose to fit an Autoregressive (AR) model to estimate the rate of change in salaries over time. This model could take the following form:

$$\text{Salaries}_t = \alpha + \sum_{i=1}^{p} \beta_i \text{Salaries}_{t-1} + \varepsilon_t$$

where Salaries$_t$ is the expenditure/balance on salaries in a given month, $\alpha$ is a constant, $\beta_i$ is a coefficient representing the rate of change in salaries, and Salaries$_{t-i}$ is the expenditure/balance on one or more previous months. The number of previous months (lags) to include in the model (p) may be determined by an information criterion (e.g. Akaike Information Criterion, or "AIC," Bayesian Information Criterion, or "BIC," etc.). The value of p and the choice of the information criterion may be determined at the model selection stage. $\varepsilon_t$ is an error term.

The preliminary analysis performed in step 534 may identify some external ("exogenous") factors that affect KPI element 204 in which the rate of change of a KPI 202 is being estimated. For example, the sales in a given month may be influenced by the average temperature. In such case, system 400 may choose an Autoregressive Integrated Moving Average with Exogenous variable which may take the following form:

$$\Delta^d \text{Sales}_t = \sum_{i=1}^{p} \delta_i \Delta^d \text{Sales}_{t-1} + \sum_{n=1}^{m} \phi_n \text{Temp}_{t-n} + \sum_{j=1}^{q} \theta_j \varepsilon_{t-j} + \varepsilon_t$$

where Sales$_t$ is the sales value in a given month, $\delta_i$, $\phi_n$, and $\theta_j$ are coefficients represents the rate of change, Sales$_{t-i}$ is the sales on previous month(s), Temp$_{t-n}$ is the average degrees of temperature in a given month, and $\varepsilon_{t-j}$ is the value of the error term in a given month to represent the moving average. The value (p) is the number of the autoregressive lags, (d) is the degree of differencing and (q) is the number of moving average lags. p, d, q may be determined by an information criterion (e.g. Akaike Information Criterion (AIC), Bayesian Information Criterion (BIC), etc.). $\varepsilon_t$ is an error term.

Model Selection 538

Utilizing one or a few model specifications may not be sufficient to obtain accurate estimates and predictions. This is due to the distinct characteristic of each KPI element 204 under investigation and the enormous number of models 230 that can be fitted to a series of values. Therefore, an autonomous model selection procedure may advantageously be used to select one of more of models 230 that provide the best accuracy of estimates and prediction, thus providing the most accurate ordinary rate of change 224.

FIG. 6A depicts step 538 in greater detail. In a step 610, models 230 are selected from those deemed more likely to accurately represent KPI 202 or KPI element 204. In some embodiments, the preliminary analysis carried out in step 534 may serve to narrow down the scope of parameters used to fit models 230 and narrow the search space for accurate models 230 that suit the distinct characteristics of KPI 202 or KPI element 204.

In a query 612, if the results provided by a model 230 are sufficiently accurate (i.e., the difference between predictions provided by the model and historical values of KPI 202 or KPI element 204 are below an accuracy threshold), model 230 may be chosen to estimate ordinary rate of change 224, and returned in a step 614. Once step 538 is complete for a KPI 202 or KPI element 204, ordinary rate of change 224 may be computed for KPI 202 or KPI element 204. Ordinary rate of change 224 may include an estimate of the rate of change, a confidence interval, and/or various performance metrics for each KPI 202 or KPI element 204 being investigated.

For example, step 538 may choose four models 230 that can be fitted given the characteristics of Fixed Assets KPI element 204 of a Return on Assets (ROA) KPI 202. One model 230 may provide an accuracy of 62% while other models 230 provide accuracy of more than 85%. Domain experts may provide 80% as the acceptable level of accuracy needed for such elements. Consequently, only three models 230 may be chosen and an ensemble learning method may be used to provide an accurate prediction (i.e., ordinary rate of change 224) using the output from the three models 230. An ensemble method may use multiple models 230 to achieve better performance than could be achieved from any of the individual learning algorithm alone.

KPI Change Rate Tracking and Notification 540, 546

Returning again to FIG. 5, in a step 540, system 400 may track the actual rate of change over time of a KPI 202 or KPI element 204, and may detect accelerating or decelerating change (either increasing or decreasing rates of change) by comparing the rate of change with the confidence interval that was previously calculated in ordinary rates of change 224 for KPI 202 or KPI element 204.

FIG. 6B illustrates step 540 in greater detail. In a step 620, the actual rate of change of KPI 202 or KPI element 204 may be calculated. In a step 622, the difference between the actual rate of change and ordinary rate of change 224 predicted by system 400 may be compared with a sensitivity threshold. The sensitivity threshold may be the threshold for notifying users of any significant change in a material KPI 202, and may be adjusted to select the sensitivity of selected models 234 to accelerating or decelerating changes in a given KPI 202 or KPI element 204. The resulting actual rate of change of KPI 202 or KPI element 204 may be returned in a step 624.

Pursuant to a query 544, system 400 may determine whether the accelerating or decelerating change to a material KPI 202 does not conform to normal behavior. If the rate of change does not conform (i.e., exceeds the sensitivity threshold of user 100), user 100 may be notified, in a step 546, with details on the particular KPI 202 and/or KPI elements 204 that triggered the accelerating or decelerating change. In a step 548, system 400 may initiate display of details related to corresponding KPI 202 and/or KPI elements 204, for example, on display screen 103, for user 100. If the rate of change conforms to normal behavior (i.e., it is not sufficiently different from that predicted by ordinary rates of change 224), then method 500 may stop 550 without transmission of the notification.

System 400 may store notification details in a log. In a step 542, the log, along with user interaction with system 400, may be used as a feedback to inform system 400 of any deviation in accuracy that could trigger a refraining/refitting of models 230.

Method 500 may be carried out periodically, with a frequency that matches the characteristics of KPIs 202 or KPI elements 204 that have been modeled. For example, if a new value of KPI 202 or KPI element 204 is recorded on a daily basis, system 400 may choose to calculate the rate of change immediately after recordation of KPI 202 or KPI element 204. Additionally or alternatively, such calculation may be performed on a larger interval, such as weekly, monthly, quarterly, etc.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for automatically prioritizing notifications of changes to key performance indicators (KPIs) to improve allocation of computing resources, the method comprising:
   at a data store, receiving data regarding operation of an enterprise;
   at a hardware processor, automatically generating the KPI based on the data;
   at the processor, automatically assessing a rate of change of the KPI;
   at the processor, automatically tracking at least one user's historical interactions with at least one KPI; and
   at the processor, improving system resource allocations efficiencies in a computing device by prioritizing the at least one KPI based on the determined historical interactions;
   wherein prioritizing the at least one KPI based on the determined historical interactions comprises:
   at the processor, based on the results of the automatic tracking, automatically obtaining materiality data regarding KPIs;
   at the processor, automatically determining materiality of the KPI to a user based, at least in part, on the obtained materiality data;
   at the processor, based on the rate of change of the KPI and further based on the determination of materiality of the KPI to the user, automatically determining whether to notify the user regarding the change to the KPI so as to prioritize notifications in a manner that improves system resource allocations efficiencies by selectively notifying users who are more likely to be interested in the change to the KPI based on their historical interactions with the KPI; and
   at the processor, responsive to the determination indicating that the user should be notified, automatically causing a notification regarding the change to the KPI to be transmitted to the user via an electronic communications network.

2. The method of claim 1, wherein automatically determining materiality of the KPI to the user comprises, at an input device, receiving user input selecting the KPI to be followed.

3. The method of claim 1, wherein automatically determining materiality of the KPI to the user comprises:
   automatically generating a materiality score based on one or more prior user actions involving the KPI; and
   automatically determining that the materiality score exceeds a threshold.

4. The method of claim 3, further comprising, at an input device, receiving user input comprising the one or more prior user actions;
   wherein the prior user actions comprise at least one of:
   selecting the KPI to be viewed;
   selecting a collection of KPIs including the KPI to be viewed; and
   requesting information regarding the KPI.

5. The method of claim 1, further comprising:
   automatically obtaining an ordinary rate of change, over time, of the KPI and/or a KPI element incorporated into the KPI; and
   automatically comparing the rate of change with the ordinary rate of change;
   and wherein the step of automatically determining whether to notify the user regarding the change to the KPI is performed at least in part based on a difference between the rate of change and the ordinary rate of change.

6. The method of claim 5, wherein automatically obtaining the ordinary rate of change comprises:
   automatically comparing historical values of the KPI or KPI element with a plurality of models to ascertain whether each of the models has at least a threshold level of accuracy; and
   automatically fitting all models of the plurality of models with at least the threshold level of accuracy to the KPI or KPI element.

7. The method of claim 5, wherein automatically obtaining the ordinary rate of change comprises:
   automatically deconstructing the KPI into one or more of the KPI elements, each of which comprises at least part of the data, or of intermediate data obtained from the data; and
   automatically fitting a model to the one or more KPI elements.

8. The method of claim 5, wherein automatically obtaining the ordinary rate of change comprises:
   automatically pre-processing the KPI and/or the KPI element by carrying out one or more selections from the group consisting of:
   linear transformation;
   winsorizing;
   Fourier transformation;
   standardization; and
   normalization; and
   automatically fitting a model to the KPI and/or the KPI element.

9. The method of claim 5, wherein automatically obtaining the ordinary rate of change comprises:
   preliminarily analyzing the KPI and/or the KPI element by carrying out one or more selections from the group consisting of:
   normality detection;
   serial autocorrelation;
   stationarity;
   co-integration;
   noise reduction;
   timer-series decomposition;
   time-frequency analysis; and
   spectral density estimation; and
   automatically fitting a model to the KPI and/or the KPI element.

10. The method of claim 1, wherein automatically causing the notification to be transmitted to the user via an electronic communications network comprises causing a communications device to transmit the notification to the user via the electronic communications network.

11. A non-transitory computer-readable medium for automatically prioritizing notifications of changes to key performance indicators (KPIs) to improve allocation of computing resources, comprising instructions stored thereon, that when performed by a hardware processor, perform the steps of:
    causing a data store to receive data regarding operation of an enterprise;

automatically generating the KPI based on the data;
automatically assessing a rate of change of the KPI;
automatically tracking at least one user's historical interactions with at least one KPI; and
improving system resource allocations efficiencies in a computing device by prioritizing the at least one KPI based on the determined historical interactions;
wherein prioritizing the at least one KPI based on the determined historical interactions comprises:
based on the results of the automatic tracking, automatically obtaining materiality data regarding KPIs;
automatically determining materiality of the KPI to a user based, at least in part, on the obtained materiality data;
based on the rate of change of the KPI and further based on the determination of materiality of the KPI to the user, automatically determining whether to notify the user regarding the change to the KPI so as to prioritize notifications in a manner that improves system resource allocations efficiencies by selectively notifying users who are more likely to be interested in the change to the KPI based on their historical interactions with the KPI; and
responsive to the determination indicating that the user should be notified, automatically causing a notification regarding the change to the KPI to be transmitted to the user via an electronic communications network.

12. The non-transitory computer-readable medium of claim 11, wherein automatically determining materiality of the KPI to the user comprises causing an input device to receive user input selecting the KPI to be followed.

13. The non-transitory computer-readable medium of claim 11, further comprising, at an input device, receiving user input comprising one or more prior user actions involving the KPI, comprising at least one of:
selecting the KPI to be viewed;
selecting a collection of KPIs including the KPI to be viewed; and
requesting information regarding the KPI;
wherein automatically determining materiality of the KPI to the user comprises:
automatically generating a materiality score based on the one or more prior user actions; and
automatically determining that the materiality score exceeds a threshold.

14. The non-transitory computer-readable medium of claim 11, further comprising instructions stored thereon, that when executed by a processor, perform the steps of:
automatically obtaining an ordinary rate of change, over time, of the KPI and/or a KPI element incorporated into the KPI; and
automatically comparing the rate of change with the ordinary rate of change;
and wherein the step of automatically determining whether to notify the user regarding the change to the KPI is performed at least in part based on a difference between the rate of change and the ordinary rate of change.

15. The non-transitory computer-readable medium of claim 14, wherein automatically obtaining the ordinary rate of change comprises:
automatically comparing historical values of the KPI or KPI element with a plurality of models to ascertain whether each of the models has at least a threshold level of accuracy; and
automatically fitting all models of the plurality of models with at least the threshold level of accuracy to the KPI or KPI element.

16. The non-transitory computer-readable medium of claim 14, wherein automatically obtaining the ordinary rate of change comprises:
automatically deconstructing the KPI into one or more of the KPI elements, each of which comprises at least part of the data, or of intermediate data obtained from the data; and
automatically fitting a model to the one or more KPI elements.

17. The non-transitory computer-readable medium of claim 14, wherein automatically obtaining the ordinary rate of change comprises:
automatically pre-processing the KPI and/or the KPI element by carrying out one or more selections from the group consisting of:
linear transformation;
winsorizing;
Fourier transformation;
standardization; and
normalization; and
automatically fitting a model to the KPI and/or the KPI element.

18. The non-transitory computer-readable medium of claim 14, wherein automatically obtaining the ordinary rate of change comprises:
preliminarily analyzing the KPI and/or the KPI element by carrying out one or more selections from the group consisting of:
normality detection;
serial autocorrelation;
stationarity;
co-integration;
noise reduction;
timer-series decomposition;
time-frequency analysis; and
spectral density estimation; and
automatically fitting a model to the KPI and/or the KPI element.

19. The non-transitory computer-readable medium of claim 11, wherein automatically causing the notification to be transmitted to the user via an electronic communications network comprises causing a communications device to transmit the notification to the user via the electronic communications network.

20. A system for automatically prioritizing notifications of changes to key performance indicators (KPIs) to improve allocation of computing resources, the system comprising:
a data store configured to receive data regarding operation of an enterprise; and
a hardware processor configured to:
automatically generate the KPI based on the data;
automatically assess a rate of change of the KPI;
automatically track at least one user's historical interactions with at least one KPI; and
improve system resource allocations efficiencies in a computing device by prioritizing the at least one KPI based on the determined historical interactions;
wherein prioritizing the at least one KPI based on the determined historical interactions comprises:
based on the results of the automatic tracking, automatically obtaining materiality data regarding KPIs;
automatically determining materiality of the KPI to a user based, at least in part, on the obtained materiality data;
based on the rate of change of the KPI and further based on the determination of materiality of the KPI to the user, automatically determining whether to notify the user regarding the change to the KPI so as to prioritize notifications in a manner that improves system resource allocations efficiencies by selectively notifying users who are more likely to be interested in the change to the KPI based on their historical interactions with the KPI; and responsive to the determination indicating that the user should be notified, automatically causing a notification regarding the change to the KPI to be transmitted to the user via an electronic communications network.

21. The system of claim 20, further comprising an input device configured to receive user input selecting the KPI to be followed;

wherein the processor is further configured to automatically determine materiality of the KPI to the user by using the user input.

22. The system of claim 20, further comprising an input device configured to receive user input comprising one or more prior user actions involving the KPI, comprising at least one of:

selecting the KPI to be viewed;

selecting a collection of KPIs including the KPI to be viewed; and requesting information regarding the KPI;

wherein the processor is further configured to automatically determine materiality of the KPI to the user by:

automatically generating a materiality score based on the one or more prior user actions; and automatically determining that the materiality score exceeds a threshold.

23. The system of claim 20, wherein the processor is further configured to:

automatically obtain an ordinary rate of change, over time, of the KPI and/or a KPI element incorporated into the KPI; and automatically compare the rate of change with the ordinary rate of change;

and wherein the processor is further configured to automatically determine whether to notify the user regarding the change to the KPI, at least in part, based on a difference between the rate of change and the ordinary rate of change.

24. The system of claim 23, wherein the processor is further configured to automatically obtain the ordinary rate of change by:

automatically comparing historical values of the KPI or KPI element with a plurality of models to ascertain whether each of the models has at least a threshold level of accuracy; and automatically fitting all models of the plurality of models with at least the threshold level of accuracy to the KPI or KPI element.

25. The system of claim 23, wherein the processor is further configured to automatically obtain the ordinary rate of change by:

automatically deconstructing the KPI into one or more of the KPI elements, each of which comprises at least part of the data, or of intermediate data obtained from the data; and automatically fitting a model to the one or more KPI elements.

26. The system of claim 23, wherein the processor is further configured to automatically obtain the ordinary rate of change by:

automatically pre-processing the KPI and/or the KPI element by carrying out one or more selections from the group consisting of:

linear transformation;

winsorizing;

Fourier transformation;

standardization; and normalization; and automatically fitting a model to the KPI and/or the KPI element.

27. The system of claim 23, wherein the processor is further configured to automatically obtain the ordinary rate of change by:

preliminarily analyzing the KPI and/or the KPI element by carrying out one or more selections from the group consisting of:

normality detection;

serial autocorrelation;

stationarity;

co-integration;

noise reduction;

timer-series decomposition;

time-frequency analysis; and spectral density estimation; and automatically fitting a model to the KPI and/or the KPI element.

28. The system of claim 20, further comprising a communications device configured to, responsive to the determination indicating that the user should be notified, automatically transmit the notification to the user via the electronic communications network.

29. The method of claim 1, wherein the materiality data comprises data describing at least one selected from the group consisting of:

data describing user views of at least one KPI;

data describing the number of user views of at least one KPI;

data describing frequency of user views of at least one KPI;

data describing user requests for details concerning at least one KPI;

data describing user following behavior with respect to at least one KPI; and timestamps of start and end times of user views of at least one KPI.

30. The non-transitory computer-readable medium of claim 11, wherein the materiality data comprises data describing at least one selected from the group consisting of:

data describing user views of at least one KPI;

data describing the number of user views of at least one KPI;

data describing frequency of user views of at least one KPI;

data describing user requests for details concerning at least one KPI;

data describing user following behavior with respect to at least one KPI; and timestamps of start and end times of user views of at least one KPI.

31. The system of claim 20, wherein the materiality data comprises data describing at least one selected from the group consisting of:
- data describing user views of at least one KPI;
- data describing the number of user views of at least one KPI;
- data describing frequency of user views of at least one KPI;
- data describing user requests for details concerning at least one KPI;
- data describing user following behavior with respect to at least one KPI; and
- timestamps of start and end times of user views of at least one KPI.

\* \* \* \* \*